(12) United States Patent
Rhelimi

(10) Patent No.: US 8,909,138 B2
(45) Date of Patent: Dec. 9, 2014

(54) METHOD FOR APPLICATION SELECTION IN A WIRELESS MOBILE COMMUNICATION DEVICE IN AN NFC SYSTEM AND A CORRESPONDING WIRELESS MOBILE COMMUNICATION DEVICE

(75) Inventor: Alain Rhelimi, Meudon (FR)

(73) Assignee: Gemalto SA, Meudon (FR)

(*) Notice: Subject to any disclaimer, the term of this patent is extended or adjusted under 35 U.S.C. 154(b) by 608 days.

(21) Appl. No.: 12/995,608

(22) PCT Filed: May 29, 2009

(86) PCT No.: PCT/EP2009/056621
§ 371 (c)(1),
(2), (4) Date: Feb. 1, 2011

(87) PCT Pub. No.: WO2009/147094
PCT Pub. Date: Dec. 10, 2009

(65) Prior Publication Data
US 2011/0117839 A1    May 19, 2011

(30) Foreign Application Priority Data
Jun. 2, 2008 (EP) .................................... 08290503

(51) Int. Cl.
*H04B 5/00* (2006.01)
*G06K 19/07* (2006.01)

(52) U.S. Cl.
CPC ........ *G06K 19/0723* (2013.01); *G06K 19/0719* (2013.01)
USPC ...................................... 455/41.1; 455/550.1

(58) Field of Classification Search
CPC ....................... G06K 19/0723; G06K 19/0719
USPC ................. 455/41.1, 41.2, 550.1, 566, 569.2, 455/575.1, 575.6, 575.9, 90.3; 379/433.04
See application file for complete search history.

(56) References Cited

U.S. PATENT DOCUMENTS 7,986,917 B2 * 7/2011 Ahlgren et al. .............. 455/41.2
2002/0027832 A1 3/2002 Engelmann
(Continued)

FOREIGN PATENT DOCUMENTS

JP 2001306235 A 11/2001
JP 2007013942 A 1/2007
(Continued)

OTHER PUBLICATIONS

PCT/EP2009/056621 International Search Report. Sep. 17, 2009, European Patent Office, P.B. 5818 Patentlaan 2 NL—2280 HV Rijswijk.
(Continued)

*Primary Examiner* — Ping Hsieh
(74) *Attorney, Agent, or Firm* — The Jansson Firm; Pehr B. Jansson

(57) ABSTRACT

The invention is aimed at solving the problem of selection of an application and/or configuration in a device of an NFC system having no independent power source or when the power source of the device is temporarily out of operation or does not have an independent power source. To that end, a wireless mobile communication device of an NFC system according to the invention comprises—a sensor of the accelerometer (Ace) type to produce a signal detecting the movement of the said device while the sensor is powered by a field emitted by a coupler close to which the said device is brought,—a processor (Pro) for comparing the said movement detection signal with a predetermined sequence corresponding with an application and/or configuration, and accordingly selecting the said application and/or configuration if the comparison is positive.

7 Claims, 1 Drawing Sheet

(56) References Cited

U.S. PATENT DOCUMENTS

| 2007/0026869 A1 | 2/2007 | Dunko |
| 2008/0207124 A1* | 8/2008 | Raisanen et al. ............. 455/41.2 |
| 2009/0209293 A1* | 8/2009 | Louch ........................... 455/566 |

FOREIGN PATENT DOCUMENTS

| JP | 2008010933 A | 1/2008 |
| WO | WO2004090556 A | 10/2004 |
| WO | WO2005/038703 A1 | 4/2005 |
| WO | WO2006085246 A | 8/2006 |

OTHER PUBLICATIONS

PCT/EP2009/056621 Written Opinion of the International Searching Authority. Sep. 17, 2009, European Patent Office, P.B. 5818 Patentlaan 2 NL—2280 HV Rijswijk.

* cited by examiner

METHOD FOR APPLICATION SELECTION IN A WIRELESS MOBILE COMMUNICATION DEVICE IN AN NFC SYSTEM AND A CORRESPONDING WIRELESS MOBILE COMMUNICATION DEVICE

BACKGROUND

This invention relates to a method for the selection of an application and/or configuration relating to an application in a wireless mobile communication device in an NFC system and a corresponding wireless mobile communication device.

The wireless mobile communication device according to the invention may be:

a contactless card of the type in the ISO7816 format incorporating an integrated circuit and an antenna or a mobile telephone including an NFC controller or a smart card of the SIM type or a secured element.

In this application, NFC (Near Field Communication) means any solution allowing communication between a coupler (belonging to an infrastructure) and a wireless mobile communication device, or between at least two wireless mobile communication devices.

If the wireless mobile communication device is a mobile telephone, NFC can make it possible to make a wireless mobile communication device operate in card emulation mode, meaning that the wireless mobile communication device associated with a security element (of the smart card type) emulates the working of a contactless smart card. If the wireless mobile communication device is a mobile telephone (for example a mobile telephone that is compatible with GSM or UMTS), the SIM card is used as the security element. The uses are many and form a superset of the uses of the contactless card type: payment, ticketing (e.g. Navigo), coupons or access control. Thanks to its extended features (UI, network connection, processing capacity), the wireless mobile communication device considerably extends card-based services. For instance, the mobile device may be used to pay and reload transport tickets at any time or receive all loyalty points on one's mobile. In an alternative mode, called the "reader" mode, the wireless mobile communication device becomes a contactless card reader or a passive tag (electronic label) reader. That mode can enable a user to read information by holding their mobile before electronic tags placed in the street, on posters, on parcels or in bus shelters, or on business cards (vCard).

More specifically, the invention relates to such a method and a device capable of application selection when the device—which communicates through NFC (Near Field Communication) technology—does not have an independent power source (e.g. a battery), which is the case for example of contactless cards, or where the said power source is temporarily insufficient for correctly powering the usual devices that act as the interface with the user, such as a keypad, a monitor or a stylus or is out of operation due to voluntary action by the user (power switched Off) due to regulations that require such action (e.g. non use of the mobile terminal in aircraft or in hospitals).

The invention may be implemented in all parts of the NFC wireless mobile communication device such as in the mobile telephone or in a contactless smart card or in a combination such as a SIM card on the one hand and an NFC controller embedded in a mobile telephone on the other.

State of the Art

Wireless mobile communication devices can communicate with external infrastructure (couplers), for example on the basis of NFC standards such as ISO 14443, ISO 15693, ISO 18092, and may be supplied with power in two possible ways:

Either by extracting power from the magnetic field emitted by the coupler, and/or By an independent source of power such as a battery.

Patent application WO2006/085246 describes a method for ensuring secure NFC functionality of an NFC wireless mobile communication device involving the following:

measuring the charge status of a battery, and as soon as the measured charge status is below a predetermined limit, switching the power from the battery to a remote coupler of the infrastructure (the terminal being placed in the field of radiation of the coupler).

The wireless mobile communication device may host multiple applications that could be conflicting, meaning that they may not be able to be interfaced with the coupler of the infrastructure because they have incompatible communication parameters.

That is because in addition to the two operating modes described above as examples (card emulation and reader), an NFC wireless mobile communication device can use several contactless communication protocols and is for example capable of exchanging data according to either the protocol ISO 14443-A or the protocol ISO 14443-B or the protocol ISO 15693, etc. Each protocol defines a magnetic field emission frequency, a method for the modification of the amplitude of the magnetic field for emitting data in active mode, and a method for charge modulation using inductive coupling for emitting data in passive mode. An NFC wireless mobile communication device is thus a multi-mode and multi-protocol device. An application is defined by a protocol and mode configuration. Typically, it can include different applications, such as for example:

reader applications: the wireless mobile communication device is in reader mode to read or write on a contactless integrated circuit. The wireless mobile communication device is in this case used like an RFID reader. This type of application may be free and may for example consist in the reading of advertising data inserted in an advertising display. The application can also be paid for and consist for example in the reading of information for subscribers only. The corresponding application program is preferably held and executed by an unsecured processor if the service is free or is preferably held and executed by a secured processor if it is paid for, because it requires identifying the subscriber or authenticating the data transmitted (e.g. signature).

applications of the card emulation type: the NFC wireless mobile communication device is in card emulation mode and can be read by conventional RD couplers in payment or paid-for access control applications (payment machines, underground transit system entries etc.). The wireless mobile communication device (for example a mobile telephone) is then used like a smart card. The AP2 application program is preferably held and executed by a secured processor because access to the service requires subscriber identification.

applications of the device type may also be used: in this case, the NFC wireless mobile communication device is in device mode and dialogues with another device, for example a reader embedded in another mobile telephone or a computer. Such applications are generally free and are used for transferring packets of data from one device to another (particularly point-to-point file transfers). The application program is preferably held and executed by an unsecured processor, with computing power that is greater than a secured processor if this processor is a SIM card processor.

Many couplers that interface applications implement collision resolution algorithms in order to accept only one card in the field of the coupler regardless of the standard met by the card. US patent 2006/0022042 describes one such algorithm which is commonly used in payment terminals (Pay-pass). If two cards are held in the field of the coupler, that immediately generates a message to the user ("transaction aborted, please take the card out of the field of the coupler") asking them to remove a card. Now, some applications only operate with one type of technology (e.g. standard ISO 14443-A or ISO 14443-B) and are difficult to implement together within the same mobile device. A wireless mobile communication device hosting several applications can lead to application selection problems. A single-application device is not exposed to this difficulty because the user must have several devices and hold the appropriate one before the coupler. For example, a user with several contactless cards in their wallet would hold the right card before the coupler with the required application. By their essence, contactless cards (single-application) do not have independent power sources and the problem relating to the user interface for the selection of an application does not arise.

In respect of a wireless mobile communication device hosting several applications, the user must intervene to preselect the compatible application.

Depending on the context, the user selects a preselection (for example transport, payment, reading etc.) and holds the said wireless mobile communication device before the coupler in order to trigger a transaction.

For example, a user decides to pay with a bank account in bank X. They select the preselection containing the application of bank X and start the transaction. The preselection must be unambiguous so that it does not contain two banks that could lead to an uncertain situation as regards the terms of the transaction (e.g. two banks in the same preselection).

This choice of preselection is made through a user interface related to the wireless mobile communication device. For example, if the wireless mobile communication device is a mobile telephone, it has a screen and a keypad for interaction with a specialised application (e.g. menus) designed for that use.

Technical Problem

The said user interface (screen, keypad etc.) of the wireless mobile communication device requires independent power resources (e.g. battery), not available to a (contactless card) or to a wireless mobile communication device with depleted batteries.

SUMMARY

The invention is aimed at solving that technical problem. To that end, a method is proposed for the selection of an application by a user in a wireless mobile communication device of an NFC system, the said device not having an independent power source or the said power source being temporarily out of operation, characterised in that it comprises the stages of:

production by a sensor of the accelerometer type in the wireless mobile communication device of a signal that detects the movement of the said device, the said sensor being powered by a field emitted by a coupler close to which the device is brought, comparison of the said movement detection signal with a predetermined sequence corresponding to the application or a configuration relating to an application, selection of the said application/configuration if the comparison is positive, thus remedying the absence of the user interface because there is no independent source of power or because it is out of operation.

A wireless mobile communication device of an NFC system includes the following according to the invention:

a sensor of the accelerometer type to produce a detection signal of the movement of the said device while the sensor is powered by a field emitted by a coupler close to which the said device is brought, a processor for comparing the said movement detection signal with a predetermined sequence corresponding to an application or a configuration relating to an application, and accordingly selecting the said application/configuration if the comparison is positive.

BRIEF DESCRIPTION OF THE DRAWINGS

Other characteristics and advantages of this invention will appear more clearly in the description below, by reference to the corresponding drawings enclosed, where.

DETAILED DESCRIPTION OF THE INVENTION

Figure 1:
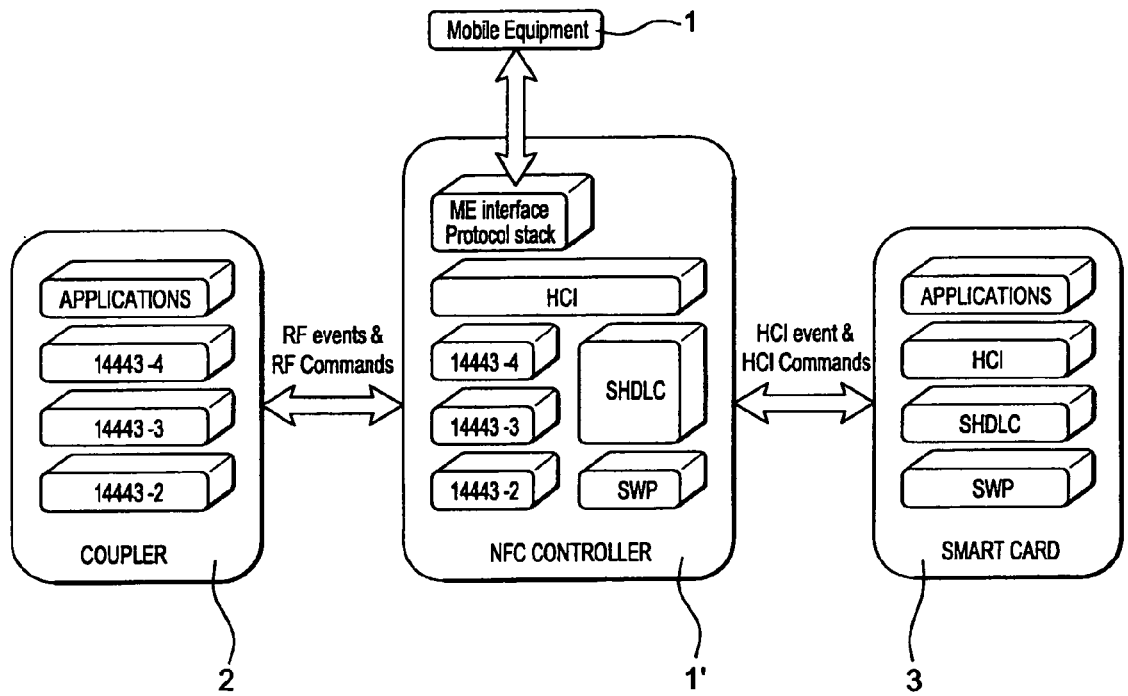
FIG. 1 shows an example of architecture of a wireless mobile communication device according to the earlier technique.

As shown in FIG. 1, a wireless mobile communication device, when it takes the form of a mobile telephone, comprises according to the anterior technique the mobile telephone itself 1 incorporating an NFC controller 1', the telephone further has a SIM card 3. The NFC controller 1' is a known component that particularly implements one or more contactless communication protocols, for example the protocol ISO14443-A and/or the protocol ISO14443-B and/or the protocol ISO15693 for communication with the remote coupler 2 with which the wireless mobile communication device in the form of a mobile telephone communicates. The coupler 2 is for example a payment terminal, a gate terminal of an underground or other transit system. One or more applications APPLICATIONS (for payment, transport etc.) are associated with the coupler 2. The NFC controller 1' also includes communication layers SWP, HDLC and HCI as defined by the ETSI (European Telecommunication Standardization Institute) in Recommendations TS 102.613 and TS 102.622, included in this application by this reference. These communication layers allow the exchange of data with the SIM card 3 through corresponding layers SWP, HDLC and HCI. In the illustrated mode of embodiment, the SIM card 3 also includes one or more applications APPLICATIONS (software) for payment, transport or other purposes which—in an application layer according to the OSI model of the ISO—exchange data with the APPLICATIONS in the coupler 2.

It must be noted that even if in the embodiment mode described here, the APPLICATIONS in the wireless mobile communication device are in the SIM card, they may alternatively be included in the NFC controller or in a specific secured element. According to another alternative, the wireless mobile communication device itself may be a contactless card in the ISO7816-1 format with integrated antenna, in which case the APPLICATIONS are in the contactless card itself.

The invention uses a device for interaction with the user that only requires very little power, which can thus be taken from the magnetic field surrounding the wireless mobile communication device.

It proposes to use a movement sensor of the electronic accelerometer type. Such silicon accelerometers are now very popular and very inexpensive. Operating as a silicon strain gauge (http://en.wikipedia.org/wiki/Strain gauge) (http://fr.wikipedia.org/wiki/Jauge de contrainte), such a sensing electronic accelerometer may be:

integrated on the secured microprocessor of the SIM card (by stacking), or
  integrated in the secured microprocessor of the SIM card (full integration), or
  integrated in the body of the SIM card (no need for security), or
  integrated on the chip of the NFC controller (stacking) in the mobile telephone, or even
  connected to the NFC controller and on the same printed circuit, or lastly
  integrated in the NFC controller.

In that way, an accelerometer may be embedded in the wireless mobile communication device either in the NFC controller, or in the secured element such as a SIM card, if the card is used in NFC applications. It goes without saying that the said accelerometer may be embedded in the body of the SIM card or in its microprocessor.

The accelerometer which is thus powered as described below through a device that extracts power from the magnetic field of the reader is made to provide information about the movement of the wireless mobile communication device in space.

By means of an agreed movement of the hand and implicitly of the wireless mobile communication device in the field of the reader, elementary commands can be transmitted as regards the preselection choice.

For example, two rotations from left to right and back in less than two seconds are used to choose preselection 1.

A rotation from right to left and back in less than two seconds is used to choose the next preselection.

This device makes it possible to find a satisfactory solution for an awkward situation where the transaction cannot be carried out because the current preselection is not compatible with the reader or its application.

Figure 2:
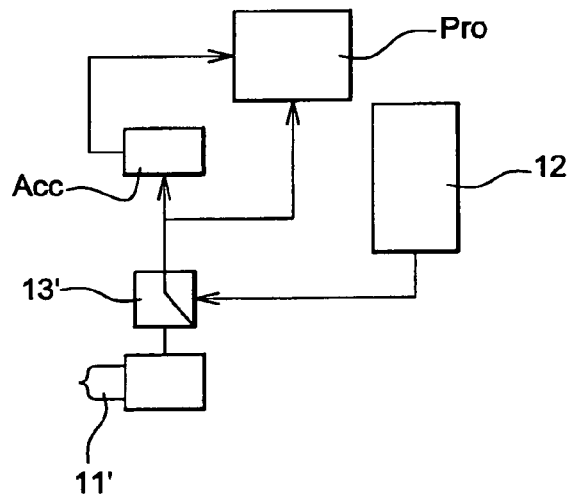
FIG. 2 shows a block diagram of circuits for implementing an embodiment mode of a wireless mobile communication device according to the invention.

By reference to FIG. 2, in the case of the mode of embodiment using a mobile telephone (and not a contactless card), it is proposed that as soon as the wireless mobile communication device is informed that it is powered by the magnetic field and not by a battery, it starts listening to the information transmitted by the accelerometer Acc in order to decode the choice. To that end, the circuit 13' measures the charge status of a battery 12 in the telephone. If that charge is below a predetermined limit, the output of a voltage rectifier 12' connected at the output of the antenna 11' of the NFC controller is selected via a relay (electronic switch, such as a MOSFET transistor) 13' so that the power supplied on the one hand to a processor Pro and to the accelerometer Acc will be supplied by the field produced by the coupler 2, when the device is brought close to the said coupler 2.

As soon as the wireless mobile communication device attempts to carry out the transaction, the order of preselections must follow that of the preferences of the user.

The digitised signals produced by the accelerometer Acc are processed by the processor Pro which accordingly selects one of the APPLICATIONS. To that end, the processor Pro comprises at least one predetermined digitised sequence corresponding to a predetermined movement of the wireless mobile communication device in space (or a plane) by the user. When the digitised signals produced by the accelerometer Acc more or less match the digitised predetermined sequence, the processor produces an application selection signal of the APPLICATION (for example underground transport, micro payment etc.) corresponding to that movement in space or in a plane. As specified in this description, that processor Pro may be either the NFC controller in a mobile telephone or the microprocessor of the SIM card in the mobile telephone connected to the NFC controller, or the processor of a secured element also connected to the NFC controller, or the microprocessor of a contactless smart card in the ISO 7816 format. An algorithm carried out by the processor Pro is used to decode the movements in order to transmit simple orders to the preselection selector. The preselection selector typically incorporated in the processor accordingly makes a selection (a)—of one of the applications by loading a program registry, possibly selecting protocol parameters etc. and/or (b)—of a mode configuration and/or protocol required for the operation to be implemented by the wireless mobile communication device.

In a totally integrated system such as a contactless card, all the operations are carried out by the same processor Pro.

For a composite system (e.g. a telephone), regardless of the place where the accelerometer is hosted (connected to or integrated in the secured element or the NFC controller), the following solution is for example possible:

the accelerometer Acc powered by the NFC controller via the radiation supplied by the coupler 2 transmits information to the processor Pro in the SIM card, which interprets it and transmits elementary orders for APPLICATIONS application selection and/or configuration to the NFC controller. Thus in this mode, the SIM card processes the data produced by the accelerometer Acc, and the NFC controller includes the APPLICATIONS and/or configuration data, which are selected by a piece of information or command sent by the SIM card. The NFC controller is responsible for executing the application APPLICATION.

The solution remains valid when the wireless mobile communication device has an independent source of power, but when that source of power is insufficient to power a conventional user interface and/or the associated electronic circuits.

The invention claimed is:

1. A method for the selection of an application from a set of at least two applications by a user in a wireless mobile communication device of an NFC system, where the said device does not have an independent source of power or the said source of power is temporarily out of operation, comprising:

producing, by a sensor of the accelerometer type in the wireless mobile communication device, a signal detecting the movement of the said device, the sensor being powered by a field emitted by a coupler close to which the device is brought,
  comparing the movement detection signal with a predetermined sequence corresponding to one of the applications in the set of at least two applications and indicative of that the one of the applications should be selected,
  if the comparison is positive, selecting the application corresponding to the movement detection signal thus making up for the absence of the user interface because of the absence of an independent source of power or its being put out of operation.

2. A wireless mobile communication device of an NFC system, comprising:
   a sensor of the accelerometer type to produce a detection signal of the movement of the said device while the sensor is powered via a field emitted by a coupler close to which the said device is brought, the said device not having an independent source of power or the said source of power being temporarily out of operation,
   a processor to compare the said movement detection signal with a predetermined sequence corresponding to an application in a set of at least two applications and indicative of that the one of the applications should be selected, and accordingly select the application if the comparison is positive.

3. A wireless mobile communication device of an NFC system according to claim 2, further comprising:
   a contactless card of the type in ISO7816 format incorporating an integrated circuit and an antenna, the said sensor of the accelerometer type being of silicon and operating as a silicon strain gauge, being stacked on or integrated into the integrated circuit.

4. A wireless mobile communication device of an NFC system according to claim 2, further comprising:
   a mobile telephone including an NFC controller or a smart card of the SIM type or a secured element.

5. A wireless mobile communication device of an NFC system according to claim 4, wherein the said sensor of the accelerometer type is of silicon and operates as a silicon strain gauge, being stacked on or integrated into the integrated circuit forming the NFC controller.

6. A wireless mobile communication device of an NFC system according to claim 4, wherein the said sensor of the accelerometer type is of silicon and operates as a silicon strain gauge, being stacked on or integrated into an integrated circuit of the SIM card of the secured element.

7. A wireless mobile communication device of an NFC system according to any of claims 4 to 6, wherein the application data are stored in either the NFC controller or the SIM card or the secured element.

* * * * *